June 25, 1929.  H. J. O'SULLIVAN  1,718,485
VULCANIZING DEVICE
Filed July 20, 1926
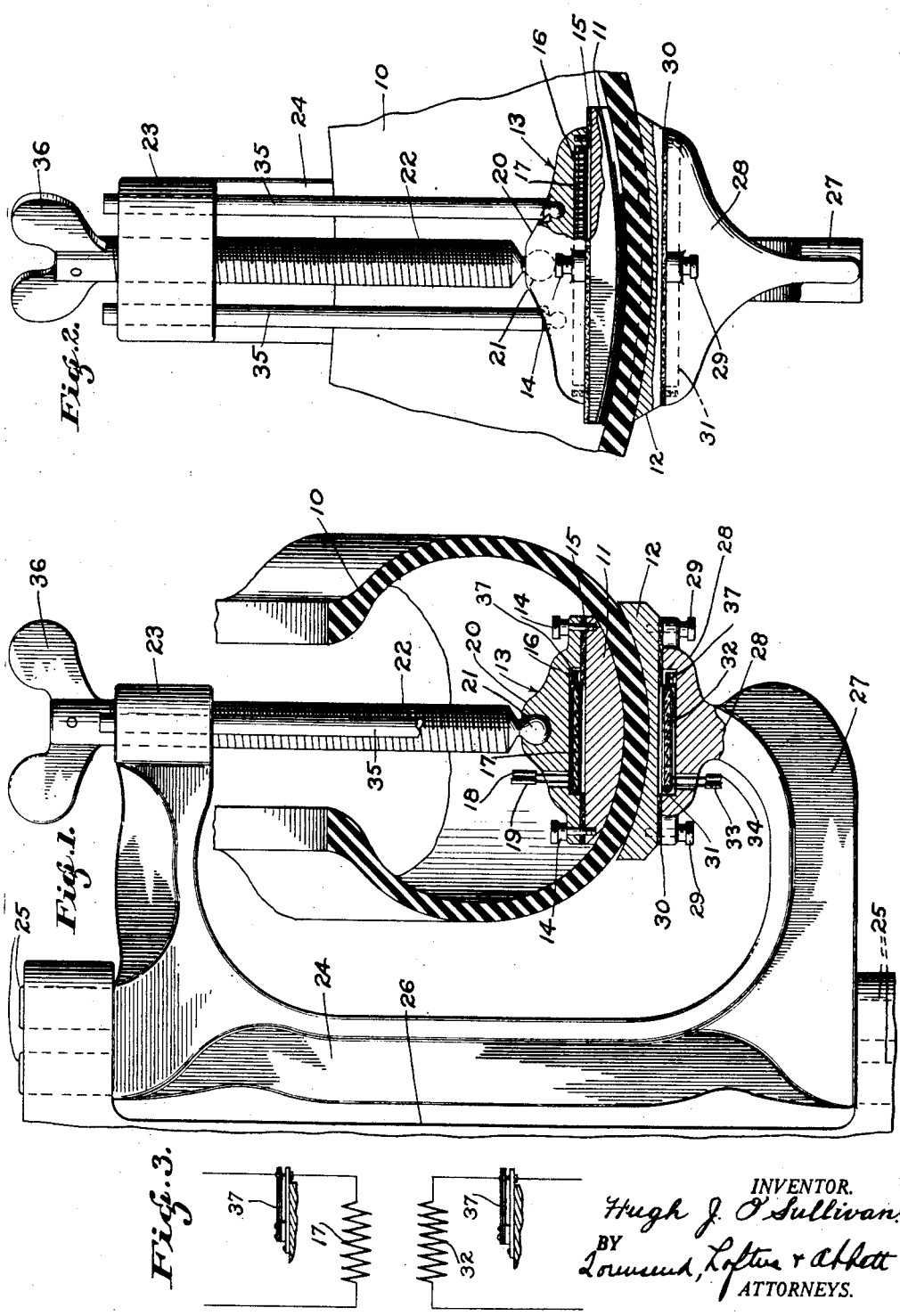
INVENTOR.
Hugh J. O'Sullivan.
BY
Townsend, Loftus & Abbett
ATTORNEYS.

Patented June 25, 1929.

1,718,485

UNITED STATES PATENT OFFICE.

HUGH J. O'SULLIVAN, OF LOS ANGELES, CALIFORNIA, ASSIGNOR OF ONE-HALF TO HOWARD J. BENSINGER, OF LOS ANGELES, CALIFORNIA.

VULCANIZING DEVICE.

Application filed July 20, 1926. Serial No. 123,746.

This invention relates to a vulcanizing device, and particularly pertains to means for vulcanizing automobile tire casings.

In the vulcanizing of rubber, and particularly when automobile tire casings are vulcanized, it is desirable that the material to be vulcanized shall be subjected to uniform heat at a uniform pressure and throughout an accurately determinable period of time. These desirable results cannot be obtained by the usual type of vulcanizing device in which heat is applied to one side of the casing wall, and which heat is generated by slowly acting means, such as steam.

It is the principal object of the present invention, therefore, to provide a vulcanizing structure which will insure uniform heating of the mass to be vulcanized while maintaining a desired pressure, and while making it possible to accurately control the temperature of the heating medium and the period of time during which the medium is applied.

In carrying out this invention it is contemplated to utilize complementary pressure members, adapted to be disposed upon opposite sides of the wall to be vulcanized and shaped to conform to the contour of the surfaces of the wall, said pressure members each being equipped with an electric heating element by which the pressure plates may be heated to a desired temperature and maintained at this temperature during the vulcanizing operation.

The invention is illustrated by way of example in the accompanying drawing in which—

Fig. 1 is a view in transverse section through the vulcanizing device with which the present invention is concerned, and shows the construction of the pressure members, the location of the heating elements therein and means for applying pressure.

Fig. 2 is a view in longitudinal section through the vulcanizing device, showing parts in elevation and disclosing the pressure members in section.

Fig. 3 is a diagrammatic view of the heating unit.

Referring more particularly to the drawings, 10 indicates an automobile shoe casing. It will be understood, however, that other rubber articles may be vulcanized with this structure by simply changing the shoes 11 and 12, between which the article to be vulcanized is placed. These shoes are complementary to each other in that one has a concaved face adapted to conform to the outer contour of the article to be vulcanized and the other has a convexed face adapted to conform to the inner surface of the article to be vulcanized.

The upper convexed shoe 11 is secured to a pressure plate 13 by means of screws 14. An asbestos washer 15 is interposed between the shoe 11 and the pressure plate 13. The pressure plate 13 is formed with a cavity 16 in its under face to receive an electric heating element 17. This heating element is attached to lead wires 18 and 19, through which wires an electric circuit may be established through the heating element.

The upper part of the pressure plate 13 is formed with a socket 20 to receive a ball 21 carried as a part of a pressure screw 22. This screw extends through a threaded bearing 23 forming one arm of a C-clamp frame 24. The C-clamp frame is fitted with trunnions 25 mounting it in a supporting bracket 26, which can be clamped to a work bench with either of arms 23 or 27 uppermost. The lower arm of the C-clamp, as indicated at 27, is formed integral with a lower pressure pad 28. This pad carries the lower shoe 12, which shoe is secured to the pressure pad 28 by screws 29. A thin asbestos washer 30 is interposed between the pad and the shoe.

The screws 14 and 29 and their spacing is identical, thereby making the shoes 11 and 12 interchangeable.

The upper face of the pad, and against which face the shoe is secured, is formed with a pocket 31 to receive a heating element 32. This heating element is connected by wires 33 and 34 to a suitable source of electric supply.

By reference to Fig. 2 of the drawing, it will be seen that rods 35 are disposed upon opposite sides of the pressure screw 22; the lower ends of said rods being somewhat loosely fastened to the pressure plate 13 and the upper ends of said rods slidably extending through the bearing member 23 formed as a part of the C-clamp 24. Such loose connection of the rods with the pressure plate permits a rocking movement of shoe 11, which allows the same to adjust itself to any unevenness in the tire.

In the operation of the present invention the article to be vulcanized is disposed between the shoes 11 and 12. These shoes have been previously selected with pressure faces of a desired contour and have been thereafter fastened to the pressure plate 13 and the pressure pad 28, respectively, so that the article to be vulcanized could be clamped between the plates. After the article has been thus disposed, the pressure screw 22 may be rotated by the wings 36, secured at the upper end of the screw. This will cause pressure to be exerted between the pad 28 and the pressure plate 13 as the pressure plate 13 moves downwardly and is held against rotation by the guide rods 35. It will be evident that due to this arrangement uniform pressure will be applied to both sides of the article to be vulcanized and, in fact, a uniform pressure will be exerted upon the entire mass of material disposed between the shoes 11 and 12.

When the article has been properly clamped electric current may be supplied to the heating elements 17 and 32. This current will pass through the resistance members of the heating elements and cause the shoes 11 and 12 to be heated. It is desirable that the circuit of the heating elements shall be controlled by a thermostat so that a desired temperature may be established and maintained within the heating elements. For that purpose a thermostat structure 37 is mounted in the recesses 16 and 31 to control the flow of current to the two heating elements.

It is evident that by this arrangement a desired heat may be established in the heating elements and will be caused to permeate the mass of material disposed between the shoes 11 and 12. This will prevent overcuring of the rubber, on one side of the mass, such as is the case where heat is transmitted from one side only and has to penetrate through one side to cure the opposite surface, and will also ensure that the mass may be rapidly and thoroughly cured to the desired condition. It will also be understood that when a greater part of the new material is to be applied to one side of the mass it may be desirable to vary the temperatures on opposite sides of the article to be vulcanized and for that reason the electric current to the heating elements may be discontinued at the will of the operator.

After this has been accomplished the screw 22 is rotated in a reverse direction to retract the shoe 11 and permit the article vulcanized to be removed from its previously clamped position. It is to be understood that while the pockets for receiving the heating elements are shown in Figure 1 of the drawings as being in the pressure plates 13 and 28, it will be within the contemplation of the invention to form the cavities in the shoes themselves.

It will thus be seen that by the structure here disclosed it is possible to exert a desired uniform pressure upon a mass of material to be cured, thereafter to uniformly apply dry heat to and through the entire mass at a desired temperature for a given period of time; or to accurately vary the degree of heat applied to opposite sides of the mass as conditions require, all of which desirable results are brought about in a structure which is decidedly simple in construction, relatively cheap as to manufacturing cost in comparison with other vulcanizing outfits, portable, and may be readily operated to thoroughly cure a mass of material under varying conditions.

While I have shown the preferred form of my invention as now known, it will be understood that various changes might be made in the combination, construction and arrangement of parts by those skilled in the art without departing from the spirit of the invention.

I claim:

1. In a vulcanizing device for tire casings, a substantially C-shaped clamping frame, a pressure pad formed on one arm of the clamping frame, a second pressure pad cooperating with the first pad, a screw cooperating with the frame and the second pressure pad, a swivel joint between said second pressure pad and said screw to compensate for unevenness of the treated material, and guide means cooperating with the screw and the frame to prevent turning of said second pad and at the same time not interfere with the operation of the above swivel joint.

2. In a vulcanizing device, a clamping frame, a heating element, a screw mounted in the clamping frame for exerting pressure upon said heating element, a swivel joint between the screw and said heating element to permit compensation for uneven vulcanizing surfaces, and guide rods slidably mounted in the clamping frame and loosely connected with the heating element and cooperating with the screw to maintain the said heating element in an operative position without interfering with said swivel joint.

HUGH J. O'SULLIVAN.